Figure 6:
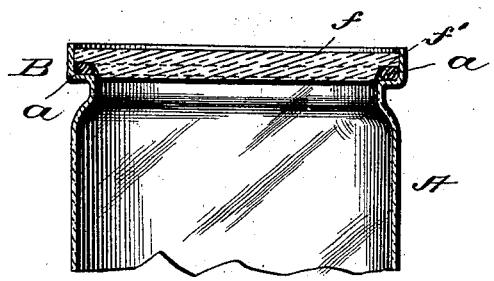

No. 712,049. Patented Oct. 28, 1902.
J. S. DU BOIS.
SELF SEALING JAR.
(Application filed Jan. 14, 1902.)
(No Model.) 2 Sheets—Sheet 1.
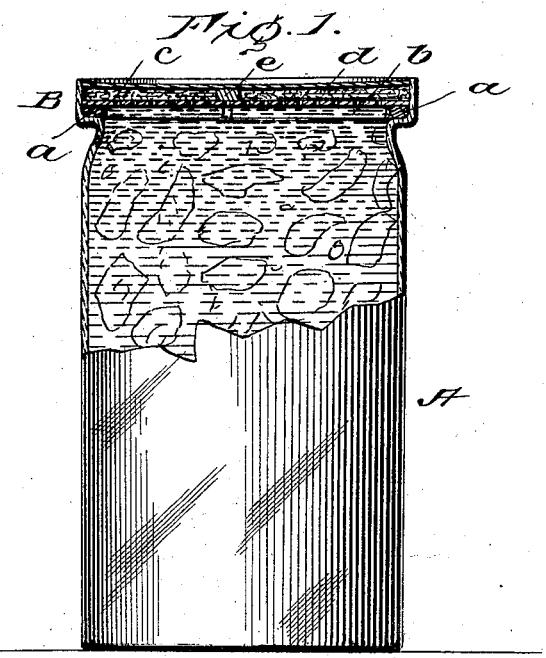
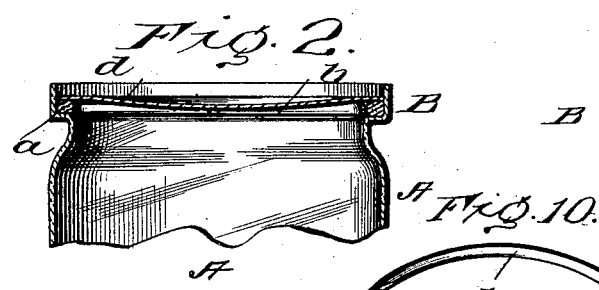
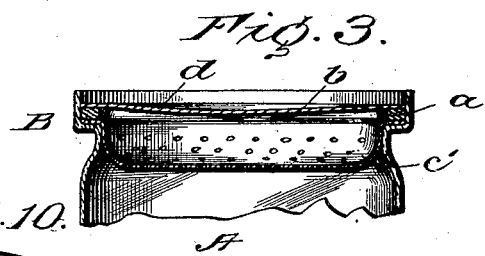
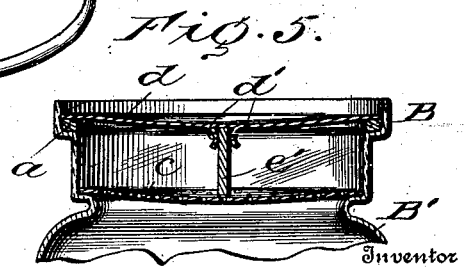

No. 712,049. Patented Oct. 28, 1902.
J. S. DU BOIS.
SELF SEALING JAR.
(Application filed Jan. 14, 1902.)

(No Model.) 2 Sheets—Sheet 2.

UNITED STATES PATENT OFFICE.

JOSIAH S. DU BOIS, OF CAMDEN, NEW JERSEY.

SELF-SEALING JAR.

SPECIFICATION forming part of Letters Patent No. 712,049, dated October 28, 1902.

Application filed January 14, 1902. Serial No. 89,722. (No model.)

*To all whom it may concern:*

Be it known that I, JOSIAH S. DU BOIS, a citizen of the United States, residing at Camden, in the county of Camden and State of New Jersey, have invented certain new and useful Improvements in Self-Sealing Jars, of which the following is a specification.

Objects of the invention are to insure the perfect sealing of the jar, to simplify its construction and that of its self-acting lid or closure, and to provide means for keeping the fruit, vegetables, or meats immersed in the syrup or canning fluid, said means presenting a surface or surfaces upon which the mold may accumulate, or upon the removal of the lid acting to skim off any mold that may have formed upon the surface of the canning solution.

To these and other objects presently discussed the invention consists in the self-sealing preserving jar or vessel and in the novel construction, combinations, and arrangements of parts thereof hereinafter described and claimed.

The nature, characteristic features, and scope of the invention will be more clearly understood by reference to the accompanying drawings, forming a part hereof, and in which—

Figure 1 is a sectional elevational view of a self-sealing jar embodying features of my invention. Fig. 2 is a sectional view similar to that of Fig. 1 with the omission of the immersing-plate. Figs. 3, 4, and 5 illustrate varied ways of mounting the immersing-plate. Figs. 6, 7, 8, and 9 illustrate varied forms of the lid. Fig. 10 is a detail illustrating the split spring-washer.

In the drawings, A is a glass or other jar, which is of the simplest construction, being here shown as having the same general diameter throughout, although it may be otherwise formed. The top of the jar is provided with an internal annular flange or shoulder B and terminates in a smooth cylindrical mouth portion, the flange or shoulder B being transversely extended at its top to provide a seat for the lid or cover.

The closure, Fig. 1, comprises an annular gasket $a$, of rubber or other material capable of being compressed, which is seated on the shoulder B and may or may not be held to place thereon by a split spring-washer $b$ or its equivalent. $c$ is a perforated disk or immersing-plate, which is seated on the gasket or packing $a$ and serves to keep the preserved products immersed in the preserving solution. The lid proper consists of an imperforate disk $d$, which is spaced apart from the immersing-plate by an intermediate or distance piece $e$.

In Fig. 2 the closure is shown without the immersing-plate and with the lid $d$ swelled or convexed inward.

In the construction Fig. 3 the immersing-plate $c'$ is dish or pan shaped, with a peripheral flange that is seated directly on the shoulder of the jar, and the packing $a$ is disposed between the immersing-plate and the lid.

In Fig. 4 two packing-rings $a$ and $a'$ are employed, disposed, respectively, between the shoulder B and the immersing-plate and between the plate and lid $d$, a distance-piece $e$ being employed, as in Fig. 1.

In the construction Fig. 5 the jar is provided with an additional or lower shoulder B', on which is seated the immersing-plate $c$, which is separated from the lid $d$ by a distance-piece $e'$. The lid $d$ has the packing-ring $a$ interposed between it and the shoulder $b$ and is provided with lugs or guide-pieces $d'$ to accommodate the distance-piece. By employing the additional shoulder on the jar and the distance-piece $e'$ a greater space is obtained between the lid and immersing-plate, and consequently a greater depth of fluid above the fruit or vegetables.

Figure 7:
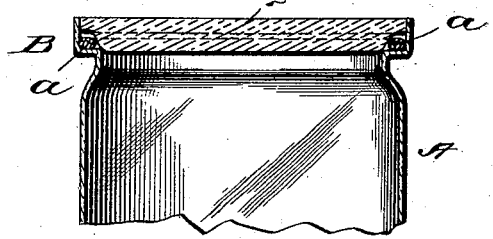

The closures above described are generally of metal; but in Figs. 6 and 7 I have shown a closure of which the lid may be of glass or porcelain. In Fig. 6 $f$ indicates such a lid, which is provided with a marginal groove or seat $f'$ to accommodate the packing-ring $a$, and $g$, Fig. 7, indicates a modification in which the rim is inclined or curved.

Figure 8:
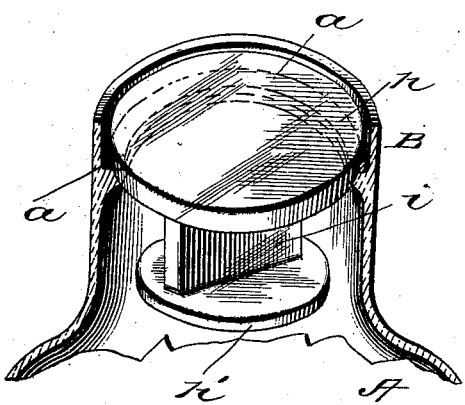
Figure 9:
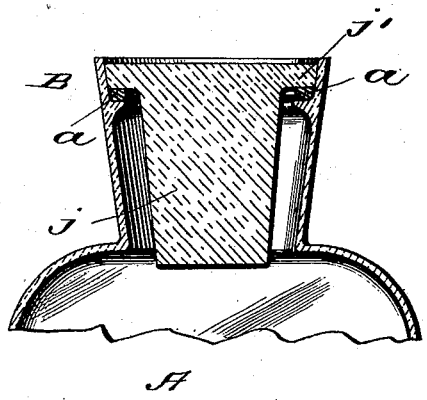

In the aforementioned constructions the lid and immersing-plate are independent of each other as regards their separability; but for economical and other reasons it is sometimes desirable to have them integral. Figs. 8 and 9 are examples of the latter type. In the former figure $h$ and $h'$ illustrate concentric annular plates connected by a distance-piece $i$. The lower plate $h'$ is sufficiently small to pass the shoulder B on the jar and tends to keep the solid or semisolid contents of the jar immersed in the preserving fluid, and the upper plate has its margin resting upon a packing-ring $a$ and coacts therewith to form a hermetic seal. In Fig. 9 the closure takes the form of a cap having an extended base portion $j$, which forms an annular space between it and the neck of the jar for the passage of the preserving fluid. The cap is provided with the overhanging flange or shoulder $j'$, which coöperates with the packing $a$ to seal the jar. In both instances it will be observed that the lid presents a greatly-increased surface or surfaces upon which the mold may accumulate, thus drawing the latter away from the contents of the jar and effecting a more satisfactory preservation of the same. The filled jars having the cover applied as indicated are then subjected to an air-exhausting operation. This may be done in the manner shown and described in United States Letters Patent No. 533,975, granted to me February 4, 1896, and in which the filled jars are placed in a vacuum-chamber and the air expelled or exhausted from them. When a vacuum has been established in the jars by first exhausting the air from the exterior vessel, and, secondly, by suddenly admitting air thereto, as described in said patent, the atmospheric pressure will be sufficient to force and hold the lids down upon their seats, whereby the packing or gasket $a$ will be tightly compressed against the jar, thereby constituting a hermetic seal.

Where a vacuum-creating device is not generally at hand—as, for instance, in private households—a vacuum may be formed by placing a weight on the lid while the contents of the jar are still hot.

It will be obvious to those skilled in the art to which the invention appertains that modifications may be made in details without departing from the spirit and scope of the invention. Hence I do not limit myself to the precise construction and arrangement of parts hereinabove described, and illustrated in the accompanying drawings; but, Having described the nature and objects of the invention, what I claim as new, and desire to secure by Letters Patent, is—

1. The combination of a jar having an internal annular flange or shoulder near its open end, a packing-ring seated on said shoulder, a perforated immersing-plate supported by said ring, a packing-ring above the immersing-plate, an imperforate lid held against said last-mentioned ring by atmospheric pressure, and an intermediate distance-piece for convexing the immersing-plate, substantially as described.

2. The combination of a jar having an internal annular flange or shoulder near its open end, a packing-ring seated on said shoulder, a spring for holding said ring to place, an immersing-plate, a lid held against said ring by atmospheric pressure with its top below or substantially flush with the top of the jar, and a distance-piece for spacing said lid and immersing-plate apart, substantially as described.

In testimony whereof I have signed my name in the presence of two subscribing witnesses.

JOSIAH S. DU BOIS.

Witnesses:
W. J. JACKSON,
K. M. GILLIGAN.